United States Patent
Kim

(10) Patent No.: US 10,168,150 B2
(45) Date of Patent: Jan. 1, 2019

(54) APPARATUS AND METHOD FOR AUTO-LEVELING STEERING WHEEL

(71) Applicant: Hyundai Motor Company, Seoul (KR)

(72) Inventor: Dong Myong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 146 days.

(21) Appl. No.: 15/183,271

(22) Filed: Jun. 15, 2016

(65) Prior Publication Data

US 2017/0131095 A1 May 11, 2017

(30) Foreign Application Priority Data

Nov. 11, 2015 (KR) ........................ 10-2015-0158356

(51) Int. Cl.
| | |
|---|---|
| *B62D 15/02* | (2006.01) |
| *G01M 17/06* | (2006.01) |
| *G01C 9/00* | (2006.01) |
| *G01B 21/26* | (2006.01) |
| *B62D 5/04* | (2006.01) |
| *B62D 1/10* | (2006.01) |
| *G01B 21/22* | (2006.01) |

(52) U.S. Cl.
CPC ............... *G01B 21/26* (2013.01); *B62D 1/10* (2013.01); *B62D 5/0466* (2013.01); *B62D 15/0245* (2013.01); *G01C 9/00* (2013.01); *G01M 17/06* (2013.01); *G01B 21/22* (2013.01)

(58) Field of Classification Search
CPC .......... G01M 17/16; B62D 15/02; G01C 9/00
USPC ........................................... 33/1 N, 370, 371
See application file for complete search history.

(56) References Cited

U.S. PATENT DOCUMENTS

| | | | | |
|---|---|---|---|---|
| 3,813,932 | A * | 6/1974 | Wallace | G01M 17/06 73/117.02 |
| 3,889,527 | A * | 6/1975 | Wallace | G01M 17/06 33/203 |
| 4,893,413 | A * | 1/1990 | Merrill | B62D 17/00 33/203.12 |
| 4,931,964 | A | 6/1990 | Titsworth et al. | |
| 5,105,546 | A | 4/1992 | Weise et al. | |
| 6,076,269 | A * | 6/2000 | Sekino | G01B 21/26 33/371 |
| 8,825,211 | B2 * | 9/2014 | Park | G01B 11/272 700/253 |
| 8,844,147 | B2 * | 9/2014 | Wilds | B62D 1/00 33/301 |
| 2002/0193910 | A1 | 12/2002 | Strege et al. | |
| 2004/0107591 | A1 * | 6/2004 | Cuddy | G01C 9/00 33/370 |

(Continued)

FOREIGN PATENT DOCUMENTS

| | | |
|---|---|---|
| CN | 201053925 Y | 4/2008 |
| CN | 103884518 | 6/2014 |

(Continued)

*Primary Examiner* — Christopher W Fulton
(74) *Attorney, Agent, or Firm* — Mintz Levin Cohn Ferris Glovsky and Popeo, P.C.; Peter F. Corless

(57) ABSTRACT

An apparatus and a method for auto-leveling a steering wheel include an angle sensor configured to sense an inclination of the steering wheel; and a communication unit configured to wirelessly transmit an angle measured by the angle sensor to a controller controlling a driving of a motor driven power steering (MDPS).

7 Claims, 6 Drawing Sheets

(56) References Cited

U.S. PATENT DOCUMENTS

| | | | | |
|---|---|---|---|---|
| 2008/0183354 A1* | 7/2008 | Higashi | ............... | B62D 5/003 |
| | | | | 701/43 |
| 2009/0319125 A1* | 12/2009 | Lavoie | ............... | B62D 15/021 |
| | | | | 701/41 |
| 2014/0303908 A1 | 10/2014 | Sotgiu et al. | | |
| 2015/0166100 A1* | 6/2015 | Kim | ................. | B62D 5/0466 |
| | | | | 701/42 |

FOREIGN PATENT DOCUMENTS

| | | |
|---|---|---|
| JP | 8-285573 | 11/1996 |
| JP | 2646705 B2 | 8/1997 |
| JP | 4284962 B2 | 6/2009 |
| JP | 2013-23180 | 2/2013 |
| JP | 5282867 B2 | 9/2013 |
| JP | 2014-531037 | 11/2014 |
| KR | 20-0324989 | 9/2003 |
| KR | 10-2014-0075488 | 6/2014 |

* cited by examiner

APPARATUS AND METHOD FOR AUTO-LEVELING STEERING WHEEL

CROSS-REFERENCE TO RELATED APPLICATION

This application claims under 35 U.S.C. § 119(a) the benefit of Korean Patent Application No. 10-2015-0158356, filed on Nov. 11, 2015 in the Korean Intellectual Property Office, the entire contents of which are incorporated by reference herein.

BACKGROUND (a) Technical Field

The present invention relates to an apparatus and a method for auto-leveling a steering wheel, and more particularly, to an apparatus and a method for auto-leveling a steering wheel capable of automatically aligning the steering wheel and mounting the steering wheel in a vehicle.

(b) Description of the Related Art

In general, a power steering apparatus for steering a vehicle includes a hydraulic power steering apparatus and a motor driven power steering (MDPS) apparatus. More recently, the hydraulic power steering apparatus has been replaced with the MDPS apparatus, and applications of the MDPS apparatus have been increased to include compact vehicles and larger vehicles.

The MDPS apparatus senses a rotation direction of a steering wheel, and a motor rotates a steering shaft or moves a rack bar in a horizontal direction depending on the rotation direction, thereby assisting steering force of a driver.

Meanwhile, the steering apparatus uses a variable gear ratio or a direct steer specification in order to improve steering performance. However, when an assembly of a steering gear and a position of the steering wheel in the vehicle are not accurate, an excessive sense of difference may be caused, thus resulting in a quality problem. In order to solve the above-mentioned problem, it is important to reduce deviation and to set a neutral position of the rack bar and a pinion gear at the time of manufacturing or assembling the steering apparatus.

On the other hand, a reason for using the variable gear ratio or the direct steer specification as described above is that since the steering apparatus should have a small angle of the steering wheel when a large steering such as a change of direction at low and middle speeds is required, and the steering apparatus should not sensitively react according to the angle of the steering wheel around a neutral position in order to give stability at the time of driving in a straight direction at high speed, a teeth shape of the steering gear is varied so that the steering apparatus has a slow steering ratio around the neutral position, but has a fast steering ratio at the time of a large handle steering such as the change of direction, thereby achieving the above-mentioned objects.

Particularly, since a general fixed gear ratio and a variable gear ratio also correspond to an assembly deviation reduction at the time of manufacturing the steering apparatus, missing teeth or a double D type is used at the timing of fastening a gear boxy pinion part and a U-joint (column), and the column and the steering wheel for assembly convenience and the assembly deviation reduction, but in the case of the variable gear ratio having a sharp gear ratio, a minimum tolerance of the missing teeth or the double D type may also cause a problem in performance and quality. That is, the deviation at the time of simply fastening the steering wheel is 10° or more, and in the case in which the steering wheel is distorted as much as 5° or more, the performance problem may occur.

Referring to FIG. 1 (RELATED ART), a sensitivity lean of a driver means that the driver feels as if the vehicle leans due to the assembly deviation of part of the vehicle, although in actuality, the vehicle substantially does not lean. The sensitivity lean has several factors, but among these, an alignment state (hereinafter, referred to as a wheel off center) of a handle of the vehicle, i.e., the steering wheel is the most important factor. In the case in which the wheel off center is distorted, a user feels that the vehicle is not driven in a straight direction. This is the sensitivity lean.

Currently, a wheel off center task is performed in a wheel alignment process. The wheel alignment process includes an upper worker performing the wheel off center and a lower worker performing a wheel alignment adjustment (a tow and a camber). After the upper worker finishes the wheel off center, the lower worker performs the wheel alignment work. The upper worker performs the work using equipment such as a wheel leveler at the time of performing the wheel off center. The wheel leveler has an angle sensor attached thereinto to sense an inclination of a wheel when being attached to the steering wheel and display an angle to an external monitor.

However, according to the related art, since the alignment of the steering wheel (hereinafter, referred to as "wheel off center") is performed manually by the worker, errors may occur.

SUMMARY

Objects of the present invention will be described as follows.

First, an object of the present invention is to prevent equipment damage due to advancing a vehicle in a cable non-removal state.

Second, an object of the present invention is to minimize an occurrence of errors of a wheel off center amount due to manual leveling carried out by a worker.

Third, an object of the present invention is to minimize error occurring when a leveler is removed after a steering wheel is adjusted, but residual torque due to friction between a wheel and a ground, and the like, is adjusted.

Fourth, an object of the present invention is to minimize an increase in the number of work processes due to fine adjustment.

However, objects of the present invention are not limited to the objects described above, and other objects that are not described above may be clearly understood by those skilled in the art from the following description.

According to an exemplary embodiment of the present invention, an apparatus for auto-leveling a steering wheel includes an angle sensor configured to sense an inclination of the steering wheel; and a communication unit configured to wirelessly transmit an angle measured by the angle sensor to a controller controlling a driving of a motor driven power steering (MDPS).

According to another exemplary embodiment of the present invention, a method for auto-leveling a steering wheel includes steps of: sensing an inclination of the steering wheel by an angle sensor; wirelessly transmitting an angle measured by the angle sensor to a controller; and driving a motor driven power steering (MDPS) by the controller and aligning the steering wheel.

Specific matters of other exemplary embodiments will be included in a detailed description and the accompanying drawings.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
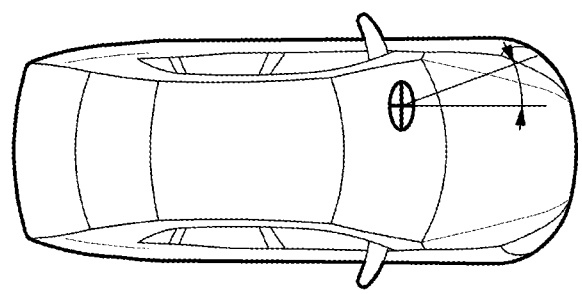
FIG. 1 (RELATED ART) is a schematic view illustrating a state in which a steering wheel of a vehicle is not aligned.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention is not limited to exemplary embodiments disclosed below, but will be implemented in various forms. The exemplary embodiments of the present invention make discussion of the present invention thorough and are provided so that those skilled in the art can easily understand the scope of the present invention. Therefore, the present invention will be defined by the scope of the appended claims. Like reference numerals throughout the description denote like elements.

Hereinafter, the present invention will be described with reference to the accompanying drawings for describing an apparatus and a method for auto-leveling a steering wheel according to exemplary embodiments of the present invention.

As provided herein, the phrase "an angle of a steering wheel is 0°" means that a steering angle of the steering wheel is approximately 0°. However, the steering angle of the steering wheel is not strictly limited to 0°, and the above-mentioned phrase includes a case in which the steering angle of the steering wheel is within an error range close to, or approximately 0°.

In addition, the phrase "a wheel is in a neutral state" means that the wheel is aligned in a straight direction. However, the above-mentioned phrase is not limited to a case in which the wheel is accurately aligned in the straight direction, and includes a case in which the wheel is within an error range (i.e., substantially aligned in the straight direction) in which the wheel may be recognized as being aligned in the straight direction.

Figure 2:
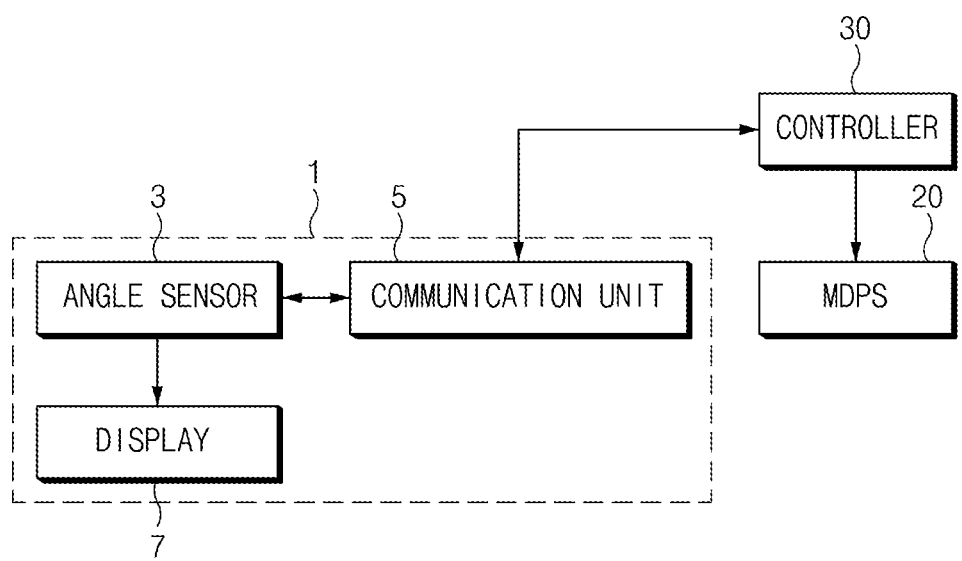
FIG. 2 is a block diagram schematically showing an apparatus for auto-leveling a steering wheel according to an exemplary embodiment of the present invention.
Figure 3:
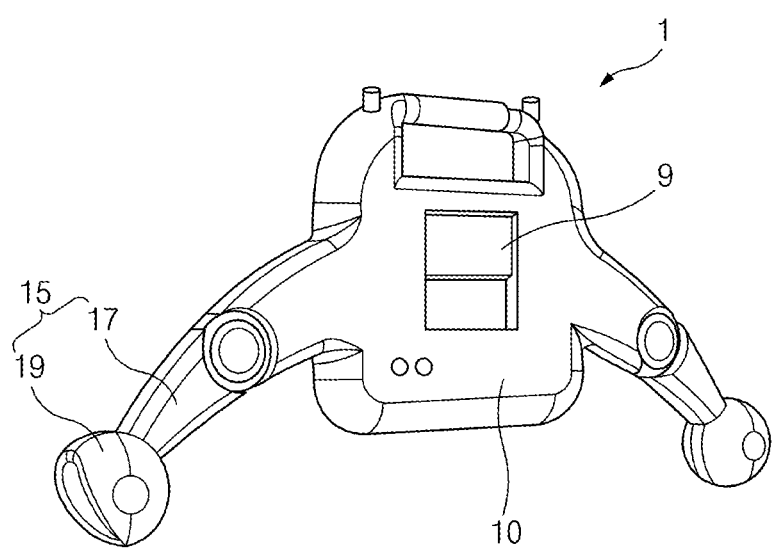
FIG. 3 is a perspective view showing a body of an apparatus for auto-leveling a steering wheel according to an exemplary embodiment of the present invention.
Figure 4:
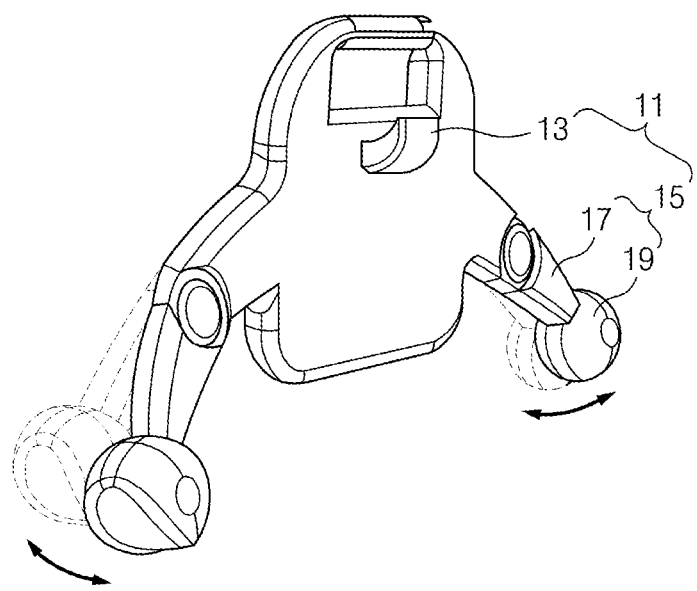
FIG. 4 is a rear perspective view showing the body of the apparatus for auto-leveling a steering wheel according to an exemplary embodiment of the present invention.

FIG. 2 is a perspective view of an apparatus 1 for auto-leveling a steering wheel according to an exemplary embodiment of the present invention. FIG. 3 is a rear perspective view of the apparatus 1 for auto-leveling a steering wheel according to an exemplary embodiment of the present invention. FIG. 4 is a perspective view of the apparatus 1 for auto-leveling a steering wheel according to an exemplary embodiment of the present invention.

Referring to FIGS. 2 to 4, the apparatus 1 for auto-leveling a steering wheel according to various exemplary embodiments of the present invention includes an angle sensor 3 configured to sense an inclination of the steering wheel, and a communication unit 5 configured to wirelessly transmit an angle measured by the angle sensor 3 to a controller 30 controlling driving of a motor driven power steering (MDPS) 20. The communication unit 5 may wirelessly transmit information using a radio wave or infrared transmission method.

The controller 30 calculates an adjustment amount of the steering wheel based on the angle of the steering wheel measured by the angle sensor 3 and transmits a driving signal to a driving motor of the MDPS 20. Accordingly, if the driving motor of the MDPS 20 is driven and the steering wheel is aligned at a normal position (i.e., the angle of the steering wheel is approximately 0°), the controller 30 transmits a normal position control signal to the MDPS 20 so that the MDPS 20 recognizes the alignment of the steering wheel.

Further, the apparatus 1 for auto-leveling a steering wheel according to various exemplary embodiments of the present invention includes a display 9 configured to display the angle measured by the angle sensor 3.

The apparatus 1 for auto-leveling a steering wheel according to a specific exemplary embodiment of the present invention includes a body 10 on which the angle sensor 3, the display 9, and the communication unit 5 are installed, and a fixer 11 configured to fix the body 10 to the steering wheel.

The fixer 11 includes a hook 13 disposed on the center of the body 10 and hooked on an inner circumference surface of the steering wheel; and a jig 15 pivotably connected to the body 10 and spread to the outside by elastic force. The jig 15 is each disposed at left and right of the hook 13.

The jig 15 includes an arm 17 spread to the outside by the elastic force; and a closely contact part 19 hinge-coupled to an end portion of the arm 17 and having a groove closely contacting with the inner circumference surface of the steering wheel formed therein.

Figure 5:
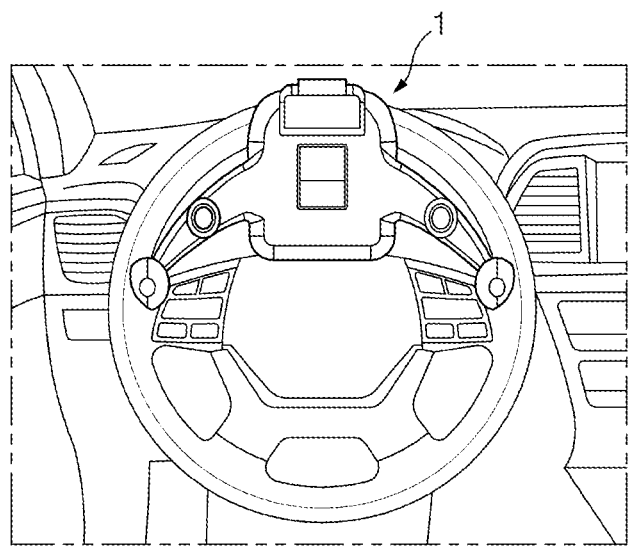
FIG. 5 is a perspective view showing the body of the apparatus for auto-leveling a steering wheel according to an exemplary embodiment of the present invention.
Figure 6:
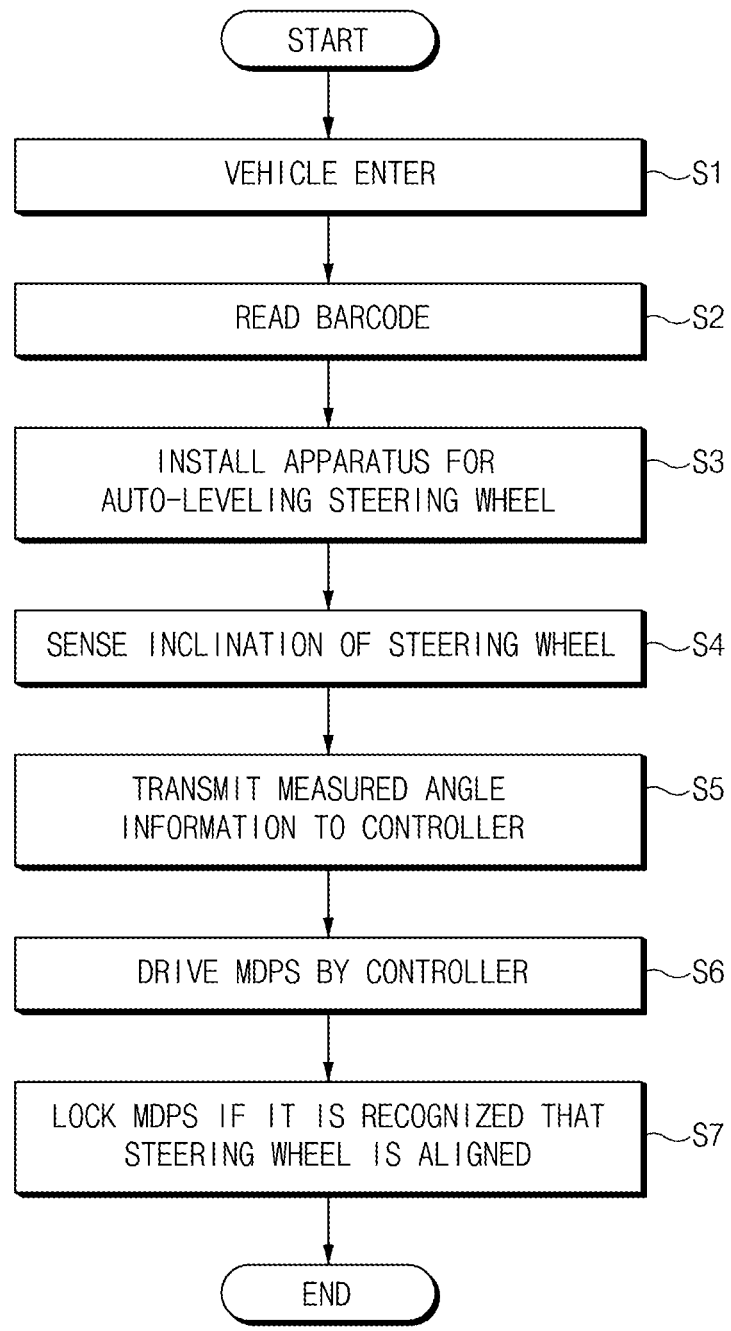
FIG. 6 is a flowchart of a method for auto-leveling a steering wheel according to an exemplary embodiment of the present invention.

FIG. 5 is a flowchart of a method for auto-leveling a steering wheel according to an exemplary embodiment of the present invention.

Referring to FIG. 5, the method for auto-leveling a steering wheel according to an exemplary embodiment of the present invention includes an operation of sensing an inclination of the steering wheel by an angle sensor 3; an operation of transmitting an angle measured by the angle sensor 3 to a controller 30; and an operation of driving a motor driven power steering (MDPS) 20 by the controller 30 and aligning the steering wheel at a normal position.

The method for auto-leveling a steering wheel according to an exemplary embodiment of the present invention includes an operation of generating a normal position control signal so that the MDPS 20 recognizes the alignment of the steering wheel when the angle of steering wheel sensed by the angle sensor 3 is approximately 0° (i.e., the steering wheel is aligned at a normal position).

Effects of the method and the apparatus for auto-leveling a steering wheel according to the exemplary embodiments of the present invention as described above will be described as follows.

First, if a vehicle enters a working zone (S1), a barcode reader reads a barcode written on the vehicle (S2). In this case, a worker may recognize a model or type of the vehicle by data transmitted from the barcode reader.

If the vehicle enters the working zone, the worker enters an interior of the vehicle while having an apparatus 1 for auto-leveling a steering wheel and installs the apparatus 1 for auto-leveling a steering wheel (S3). Since the apparatus 1 for auto-leveling a steering wheel includes a communication unit 5 which may perform wireless communication, it does not require a separate cable.

After the worker installs the apparatus 1 for auto-leveling a steering wheel, the worker drives an MDPS 20. Thereafter, the apparatus 1 for auto-leveling a steering wheel begins to be driven.

In this state, an angle sensor 3 senses an inclination of the steering wheel (S4), and transmits a sensed angle of the steering wheel to a controller 30 through the communication unit 5 (S5).

In this case, the controller 30 calculates an adjustment amount of the steering wheel based on the angle of the steering wheel transmitted from the angle sensor 3 and transmits a driving command to a driving motor of the MDPS 20. Accordingly, the driving motor of the MDPS 20 may be driven until the angle of the steering wheel sensed by the angle sensor 3 is approximately 0° (i.e., the steering wheel is aligned at a normal position) (S6).

Thereafter, if the angle sensor 3 senses that the angle of the steering wheel is approximately 0°, the controller 30 may recognize that the steering wheel is aligned and may lock the MDPS 20 by transmitting a normal position control signal to the MDPS 20 (S7).

As such, if locking of the MDPS 20 is performed, the controller 30 transmits that the alignment of the steering wheel is completed to a wheel alignment controller (not illustrated). Accordingly, a wheel alignment adjustment, which is performed subsequently, may be carried out.

According to the present invention, since the signal is wirelessly transmitted by the communication unit 5, a cable is not required, and any scratching due to a contact between the cable and the vehicle is prevented. Further, equipment damage due to advance of the vehicle in a cable non-removal state is prevented.

Further, error occurrence due to manual leveling of a worker is minimized. Further, error occurring by residue torque due to friction between the wheel and ground, and the like, after the steering wheel is adjusted is reduced. Further, the number of work processes due to fine adjustment of the worker may be reduced.

As described above, according to the exemplary embodiments of the present invention, the following effects may be obtained.

First, equipment damage due to the advance of the vehicle in the cable non-removal state may be prevented.

Second, error occurrence of the wheel off center amount due to the manual leveling of the worker may be minimized.

Third, the error occurring when the leveler is removed after the steering wheel is adjusted, but the residual torque due to the friction between the wheel and the ground, and the like, is adjusted may be minimized.

Fourth, the increase in the number of work processes due to the fine adjustment may be minimized.

However, effects of the present invention are not limited to the effects described above, and other effects that are not described above may be clearly understood by those skilled in the art from the claims.

Although the exemplary embodiments of the present invention have been disclosed for illustrative purposes, those skilled in the art will appreciate that various modifications, additions and substitutions are possible, without departing from the scope and spirit of the present invention as disclosed in the accompanying claims. Accordingly, such modifications, additions and substitutions should also be understood to fall within the scope of the present invention.

What is claimed is:

1. A system for auto-leveling a steering wheel, the system comprising:
an angle sensor configured to sense an inclination of the steering wheel;
a controller configured to control a driving of a motor driven power steering (MDPS);
a communication unit configured to wirelessly transmit an angle measured by the angle sensor to the controller;
a body on which the angle sensor and the communication unit are installed; and
a fixer configured to fix the body to the steering wheel, the fixer including a hook disposed on a center of the body and hooked on an inner circumference surface of the steering wheel,
wherein the controller is further configured to:

i) a calculate an adjustment amount of the steering wheel based on the angle measured by the angle sensor,
ii) drive the MDPS until the steering wheel is aligned at a normal position,
iii) recognize that the steering is aligned at the normal position when the angle measured by the angle sensor is approximately zero degrees, and
iv) lock the MDPS by transmitting a normal position control signal to the MDPS.

2. The system according to claim 1, wherein the communication unit wirelessly transmits information using a radio wave or infrared transmission method.

3. The system according to claim 2, further comprising a display configured to display the angle measured by the angle sensor.

4. The system according to claim 1, wherein the fixer includes:
a jig pivotably connected to the body and spread to the outside by elastic force.

5. The system according to claim 4, wherein the jig is each disposed at left and right of the hook.

6. The system according to claim 4, wherein the jig includes:
an arm spread to the outside by the elastic force; and
a closely contact part hinge-coupled to an end portion of the arm and having a groove closely contacting with the inner circumference surface of the steering wheel formed therein.

7. A method for auto-leveling a steering wheel, the method comprising the steps of:
fixing, by a fixer, a body on the steering wheel;
sensing, by an angle sensor, an inclination of the steering wheel;
wirelessly transmitting, by a communication unit, an angle measured by the angle sensor to a controller;
calculating, by the controller, an adjustment amount of the steering wheel based on the angle measured by the angle sensor;
driving, by the controller, a motor driven newer steering (MDPS) until the steering wheel is aligned at a normal position;
recognizing, by the controller, that the steering is aligned at the normal position when the angle measured by the angle sensor is approximately zero degrees; and
locking, by the controller, the MAPS by transmitting a normal position control signal to the MDPS,
wherein the fixer includes a hook disposed on a center of the body and hooked on an inner circumference surface of the steering wheel.

* * * * *